US012185078B2

(12) United States Patent
Maher et al.

(10) Patent No.: US 12,185,078 B2
(45) Date of Patent: *Dec. 31, 2024

(54) SYSTEMS AND METHODS FOR CALIBRATING SPEAKERS

(71) Applicant: Intertrust Technologies Corporation, Milpitas, CA (US)

(72) Inventors: David P. Maher, Livermore, CA (US); Gilles Boccon-Gibod, Palo Alto, CA (US); Steve Mitchell, Ben Lomond, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,474

(22) Filed: Jun. 28, 2023

(65) Prior Publication Data

US 2023/0345194 A1 Oct. 26, 2023

Related U.S. Application Data

(63) Continuation of application No. 17/804,455, filed on May 27, 2022, now Pat. No. 11,729,572, which is a (Continued)

(51) Int. Cl.

*H04S 7/00* (2006.01)

*H04R 3/04* (2006.01)

(Continued)

(52) U.S. Cl.

CPC ............... *H04S 7/301* (2013.01); *H04R 3/04* (2013.01); *H04R 5/02* (2013.01); *H04S 7/302* (2013.01);

(Continued)

(58) Field of Classification Search

CPC ........................................................ H04S 7/301

See application file for complete search history.

(56) References Cited

U.S. PATENT DOCUMENTS

| | | | |
|---|---|---|---|
| 5,386,478 | A | 1/1995 | Plunkett |
| 5,511,129 | A | 4/1996 | Craven et al. |

(Continued)

FOREIGN PATENT DOCUMENTS

| | | | |
|---|---|---|---|
| CN | 1447624 A | 10/2003 | |
| EP | 1349427 A2 | 10/2003 | |

(Continued)

OTHER PUBLICATIONS

International Search Report and International Written Opinion mailed Jun. 4, 2013 for application No. PCT/2013/027184.

(Continued)

*Primary Examiner* — Mark Fischer

(74) *Attorney, Agent, or Firm* — Finnegan, Henderson, Farabow, Garrett & Dunner, LLP

(57) ABSTRACT

Systems and method are disclosed for facilitating efficient calibration of filters for correcting room and/or speaker-based distortion and/or binaural imbalances in audio reproduction, and/or for producing three-dimensional sound in stereo system environments. According to some embodiments, using a portable device such as a smartphone or tablet, a user can calibrate speakers by initiating playback of a test signal, detecting playback of the test signal with the portable device's microphone, and repeating this process for a number of speakers and/or device positions (e.g., next to each of the user's ears). A comparison can be made between the test signal and the detected signal, and this can be used to more precisely calibrate rendering of future signals by the speakers.

17 Claims, 4 Drawing Sheets

Related U.S. Application Data continuation of application No. 17/066,804, filed on Oct. 9, 2020, now Pat. No. 11,350,234, which is a continuation of application No. 16/272,421, filed on Feb. 11, 2019, now Pat. No. 10,827,294, which is a continuation of application No. 15/861,143, filed on Jan. 3, 2018, now Pat. No. 10,244,340, which is a continuation of application No. 15/250,870, filed on Aug. 29, 2016, now Pat. No. 9,883,315, which is a continuation of application No. 13/773,483, filed on Feb. 21, 2013, now Pat. No. 9,438,996.

(60) Provisional application No. 61/601,529, filed on Feb. 21, 2012.

(51) Int. Cl.

| | |
|---|---|
| ***H04R 5/02*** | (2006.01) |
| *H04R 27/00* | (2006.01) |
| *H04R 29/00* | (2006.01) |

(52) U.S. Cl.

CPC .............. *H04S 7/307* (2013.01); *H04R 27/00* (2013.01); *H04R 29/004* (2013.01); *H04R 29/007* (2013.01); *H04R 2205/021* (2013.01); *H04R 2227/003* (2013.01); *H04R 2227/005* (2013.01); *H04R 2499/11* (2013.01)

(56) References Cited

U.S. PATENT DOCUMENTS

| | | | | |
|---|---|---|---|---|
| 5,727,074 | A * | 3/1998 | Hildebrand | H03G 5/005 381/103 |
| 6,674,864 | B1 | 1/2004 | Kitamura | |
| 6,760,451 | B1 | 7/2004 | Craven et al. | |
| 7,483,540 | B2 | 1/2009 | Rabinowitz et al. | |
| 7,664,276 | B2 | 2/2010 | McKee Cooper | |
| 7,773,755 | B2 | 8/2010 | Terauchi et al. | |
| 7,869,768 | B1 | 1/2011 | Vishlitzky | |
| 7,899,194 | B2 | 3/2011 | Boesen | |
| 7,953,456 | B2 | 5/2011 | Romesburg et al. | |
| 8,175,303 | B2 | 5/2012 | Sawashi et al. | |
| 8,213,637 | B2 | 7/2012 | Brannmark et al. | |
| 8,401,202 | B2 * | 3/2013 | Brooking | H04S 7/305 381/86 |
| 8,867,313 | B1 | 10/2014 | Rivlin et al. | |
| 9,438,996 | B2 * | 9/2016 | Maher | H04S 7/307 |
| 9,883,315 | B2 * | 1/2018 | Maher | H04S 7/301 |
| 10,244,340 | B2 * | 3/2019 | Maher | H04S 7/307 |
| 10,827,294 | B2 * | 11/2020 | Maher | H04R 5/02 |
| 11,350,234 | B2 * | 5/2022 | Maher | H04S 7/301 |
| 2003/0179891 | A1 * | 9/2003 | Rabinowitz | H04R 29/001 381/103 |
| 2005/0195988 | A1 * | 9/2005 | Tashev | H04R 3/005 381/92 |
| 2010/0042925 | A1 * | 2/2010 | DeMartin | H04N 5/60 715/810 |
| 2010/0142735 | A1 * | 6/2010 | Yoon | H04S 7/301 381/303 |
| 2012/0106747 | A1 | 5/2012 | Crockett et al. | |
| 2013/0000464 | A1 | 1/2013 | Kirsch et al. | |
| 2013/0163768 | A1 * | 6/2013 | Salter | H04R 29/00 381/56 |
| 2014/0003625 | A1 | 1/2014 | Sheen et al. | |
| 2014/0169569 | A1 | 6/2014 | Toivanen et al. | |

FOREIGN PATENT DOCUMENTS

| | | | |
|---|---|---|---|
| EP | 2197220 | A2 | 6/2010 |
| JP | 2003-324788 | A | 11/2003 |
| JP | 2005-012784 | A | 1/2005 |
| JP | 2007-259391 | A | 10/2007 |
| KR | 10-2010-0066949 | | 6/2010 |

OTHER PUBLICATIONS

Supplementary European Search Report mailed Jul. 27, 2015 for EP Application No. 13752325.4.

European Examination Report mailed Jun. 22, 2016, for EPO Application No. 13752325.4.

Fielder, L.D.; "Practical Limits for Room Equalization"; Audio Engineering Society 111th Convention Preprint; Sep. 21-24, 2001; New York, NY.

First Chinese Office Action mailed Jan. 18, 2016 for CN Application No. 201380021016.4.

First Japanese Office Action and English translation mailed Feb. 28, 2017 for Patent App. No. 2014-557890 8 pages.

Examination Report mailed May 9, 2017 for European Patent Application No. 13752325.4; (5 pages).

Second Chinese Office Action mailed Nov. 8, 2016 for CN Application No. 201380021016.4.

* cited by examiner

SYSTEMS AND METHODS FOR CALIBRATING SPEAKERS

CROSS REFERENCE TO RELATED APPLICATIONS

This application is a Continuation of U.S. application Ser. No. 17/804,455, filed May 27, 2022, which is a Continuation of U.S. application Ser. No. 17/066,804, filed Oct. 9, 2020, now U.S. Pat. No. 11,350,234, which is a Continuation of U.S. application Ser. No. 16/272,421, filed Feb. 11, 2019, now U.S. Pat. No. 10,827,294, which is a Continuation of U.S. application Ser. No. 15/861,143, filed Jan. 3, 2018, now U.S. Pat. No. 10,244,340, which is a Continuation of U.S. application Ser. No. 15/250,870, filed Aug. 29, 2016, now U.S. Pat. No. 9,883,315, which is a Continuation of U.S. application Ser. No. 13/773,483, filed Feb. 21, 2013, now U.S. Pat. No. 9,438,996, which claims the benefit of priority of Provisional Application No. 61/601,529, filed Feb. 21, 2012, all of which are hereby incorporated by reference in their entireties.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

The listening environment, including speakers, room geometries and materials, furniture, and so forth can have an enormous effect on the quality of audio reproduction. Recently it has been shown that one can employ relatively simple digital filtering to provide a much more faithful reproduction of audio as it was originally recorded in a studio or concert hall (see, e.g., http://www.princeton.edu/3D3A/BACCH_intro.html). In fact, it is possible to produce three-dimensional sound using two speakers by using active cross-talk cancellation. In virtually any kind of listening environment, one can also compensate for speaker mismatches, and variability in the room arrangement, using phase and amplitude equalization. Today, however, with music being highly portable with mp3 players, mobile phones, and the like, and with music available through Internet cloud services, consumers bring their music into many different listening environments. It is rare that these environments are configured in an optimal way, and so it is advantageous to have a simple but effective method of calibrating digital filters for use with portable devices such as mobile phones, that can be used with various kinds of audio playback devices, such as automobile audio systems, phone docking systems, Internet connected speaker systems, and the like. In addition, audio that is played on laptops, TVs, tablets, etc. can also benefit from precise digital equalization. Systems and methods are presented herein for facilitating cost-effective calibration of filters for, e.g., correcting room and/or speaker-based distortion and/or binaural imbalances in audio reproduction, and/or for producing three-dimensional (3D) sound in stereo system environments.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
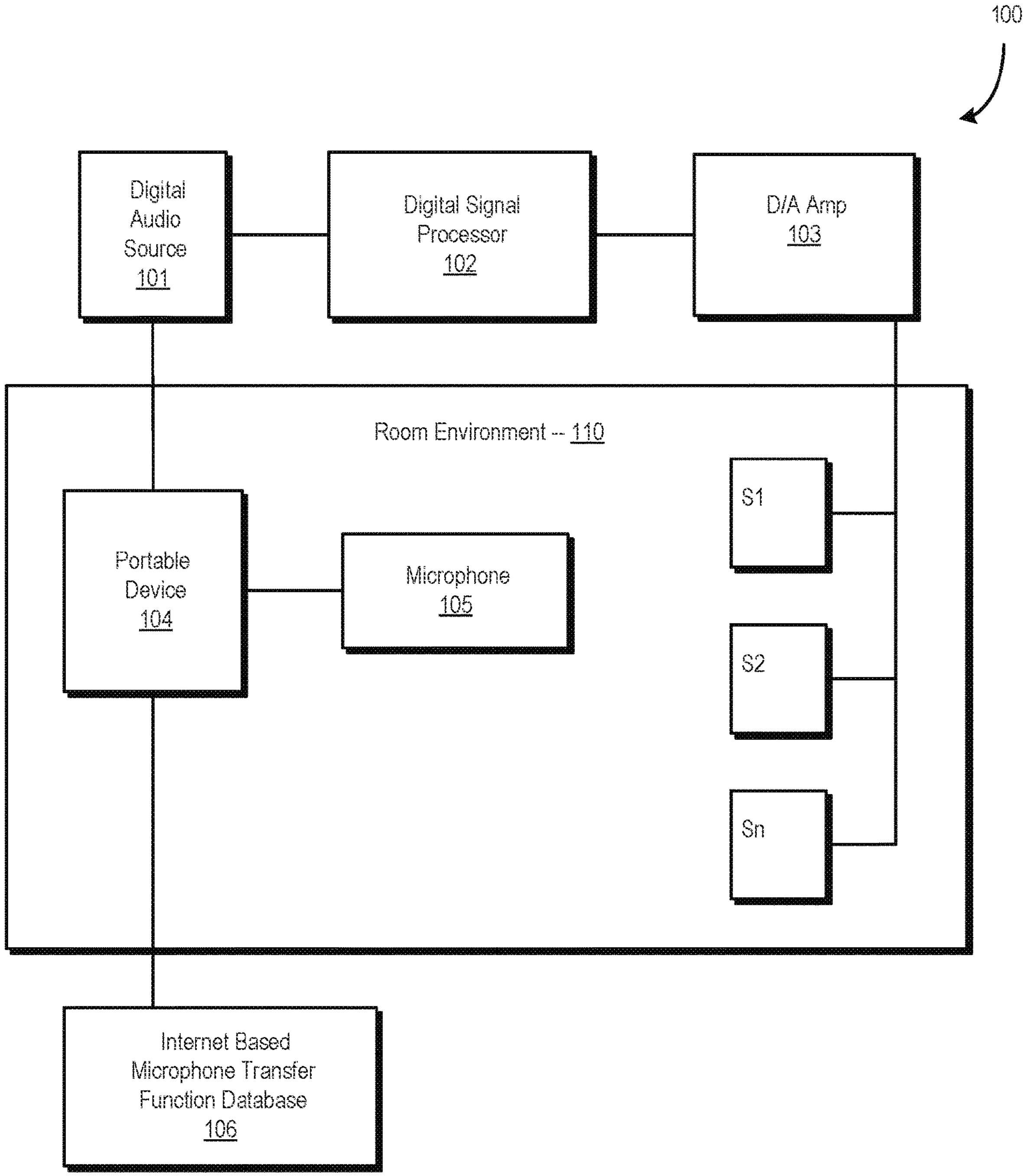
FIG. 1 illustrates an example system in accordance with an embodiment of the inventive body of work.

A detailed description of the inventive body of work is provided below. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body work.

Embodiments of the disclosure may be understood by reference to the drawings, wherein like parts may be designated by like numerals. The components of the disclosed embodiments, as generally described and illustrated in the figures herein, could be arranged and designed in a wide variety of different configurations. Thus, the following detailed description of various embodiments is not intended to limit the scope of the disclosure, as claimed, but is merely representative of possible embodiments. In addition, the actions in the methods disclosed herein do not necessarily need to be performed in any specific order, or even sequentially, nor need the actions be performed only once, unless otherwise specified.

Systems and methods are presented for facilitating cost-effective calibration of filters for, e.g., correcting room and/or speaker-based distortion and/or binaural imbalances in audio reproduction, and/or for producing three-dimensional sound in stereo system environments.

Heretofore, calibration methods for filters have been cumbersome, inconvenient, and expensive, and are not easily performed by the user of an audio source in different environments. Some embodiments of the systems and methods described herein can be used by consumers without extensive knowledge or experience, using devices that the consumers already own and know how to use. Participation by the user should preferably take a relatively short amount of time (e.g., a few seconds or minutes). This will help facilitate more widespread performance of automatic equalization methods for many more audio sources in many more environments.

Systems and methods are described herein for addressing some or all of the following illustrative situations:

- Audio from a mobile phone, played back through a wireless or wired automobile audio system, can be optimized for the specific automobile, the driver, and/or for one or more of the passengers.
- Use of network connected speakers (e.g., such as those made and distributed by Sonos (www.sonos.com))

where the audio source can be from the Internet or from a locally connected digital or analog audio source.

Audio from a network-connected device (e.g., a mobile phone, tablet, laptop, or connected TV), using speakers directly connected to or integrated with the device.

Audio from a mobile playback device (e.g., a portable music player, mobile phone, etc.), when played back through, e.g., a docking station.

It will be appreciated that the examples in the foregoing list are provided for purposes of illustration and not limitation, and that embodiments of the systems and methods described herein could be applied in many other situations as well.

FIG. 1 shows an illustrative embodiment of a system 100 for improving audio reproduction in a particular environment 110. As shown in FIG. 1, a portable device 104 is located in an environment 110. For example, portable device 104 may comprise a mobile phone, tablet, network-connected mp3 player, or the like held by a person (not shown) within a room, an automobile, or other specific environment 110. Environment 110 also comprises one or more speakers S1, S2, . . . Sn over which it is desired to play audio content. As will be described in more detail below, portable device includes (or is otherwise coupled to) microphone 105 for receiving the audio output from speakers S1-Sn. As shown in FIG. 1, the audio content originated from source 101, and possibly underwent processing by digital signal processor (DSP) 102 and digital-to-analog converter/amplifier 103 before being distributed to one or more of speakers S1-Sn.

In one embodiment, device 104 is configured to send a predefined test file to the audio source device 101 (e.g., an Internet music repository, home network server, etc.) or otherwise causes the audio source device 101 to initiate playing of the requisite test file over one or more of speakers S1-Sn. In other embodiments, device 104 simply detects the playing of the file or other content via microphone 105. Upon receipt of the played back test file or other audio content via microphone 105, portable device (and/or a service or device in communication therewith) analyzes it in comparison to the original audio content and determines how to appropriately process future audio playback using DSP 102 and/or other means to improve the perceived quality of audio content to the recipient/user.

To improve performance, such analysis and processing may take into account the transfer function of the microphone 105 (which, as shown in FIG. 1, may, for example, be obtained from a remote source), information regarding the speakers S1-Sn, and/or any other suitable information. To further improve performance, in some embodiments the test file (also referred to herein as a "reference signal") includes a predefined pattern or other characteristic that facilitates automatic synchronization between the signal source and the microphone, which might otherwise be operating asynchronously or independently with respect to one another. Such a pattern makes it easier to ensure alignment of the captured waveform with the reference signal, so that the difference between the two signals can be computed more accurately. It will be appreciated that there are many ways to create such patterns to facilitate alignment between the received signal and the reference, and that any suitable pattern or other technique to achieve alignment or otherwise improve the accuracy of the comparison could be used.

It will be appreciated that the system shown in FIG. 1 is provided for purposes of explanation and illustration, and not limitation, and that a number of changes could be made without departing from the principles described herein. For example, without limitation, in some embodiments the user's device 104 could include the audio source 101 and/or the audio playback subsystem (e.g., DSP 102, D/A converter/amplifier 103, etc.). In other embodiments, device 104 and some or all of audio source 101, DSP 102, and D/A converter/amplifier 103 can be physically separate as illustrated in FIG. 1 (e.g., located on different network-connected devices). In other embodiments, blocks 102 and/or 103 could be integrated into one or more of speakers S1-Sn. Moreover, although blocks 101, 102 and 106 are illustrated in FIG. 1 as being located outside the immediate acoustic environment 110 of portable device 104 and speakers S1, S2, . . . Sn, in other embodiments some or all of these blocks could be located within environment 110 or in any other suitable location. As another example, in some embodiments, block 101 could be an Internet music library, and blocks 102 and 103 could be incorporated into network-connected speakers on the same home network as block 105 which could be integrated in a device 104 (e.g., a tablet, smartphone, or other portable device in this example) controlling and communicating with the other devices. In this example, computation of the optimal equalization and cross-talk cancellation parameters could take place at any suitable one or more of blocks 101-109, and/or the recorded system response could be made available to a cloud (e.g., Internet) service for processing, where the optimal parameters could be computed and communicated (directly or indirectly via one or more other blocks) to one or more of blocks 101-109 (e.g., device 104, DSP 102, etc.) through a network connection. Thus it will be appreciated that while, for ease of explanation, an example embodiment has been shown in which the functionality of blocks 101, 102, 103, 104, and 105 are in, or connected to, the same device—e.g., a mobile smartphone or tablet, in other embodiments, the blocks shown in FIG. 1 could be arranged differently, blocks could be removed, and/or other blocks could be added.

Figure 2:
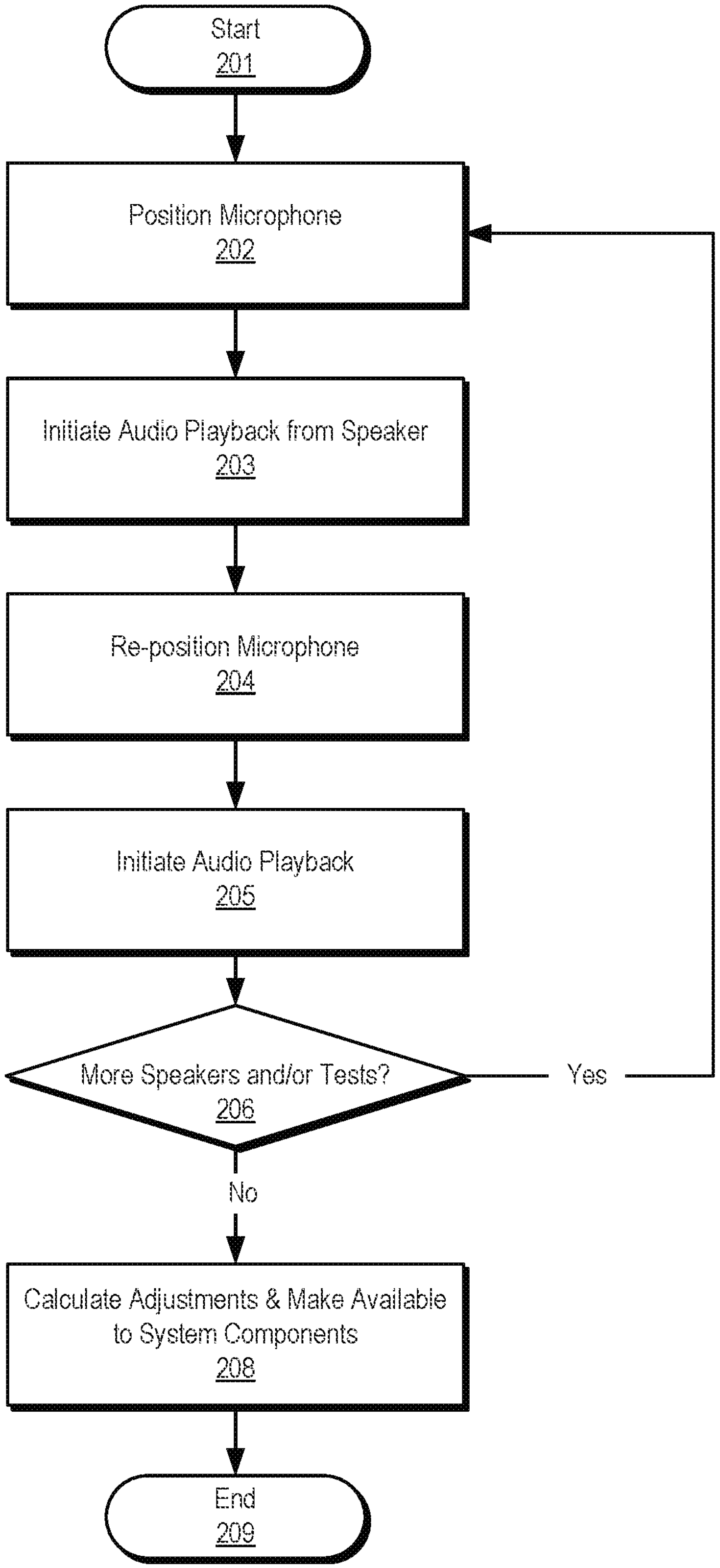
FIG. 2 shows an illustrative method for performing speaker calibration in accordance with one embodiment.

FIG. 2 shows an illustrative method for performing speaker calibration in accordance with one embodiment. As shown in FIG. 2, in one embodiment the overall procedure, from a user perspective, begins when the user installs the calibration application (or "app") onto his or her portable computing device from an app store or other source, or accesses such an app that was pre-installed on his or her device (201). For example, without limitation, the app could be made available by the manufacturer of the speakers S1-Sn on an online app store or on storage media provided with the speakers.

The device in this example may, e.g., be a mobile phone, tablet, laptop, or any other device that has a microphone and/or accommodates connection to a microphone. When the user runs the app, the app provides, e.g., through the user interface of the device, instructions for positioning the microphone to collect audio test data (202). For example, in one embodiment the app might instruct the user to position the microphone of the device next to his or her left ear and press a button (or other user input) on the device and to wait until an audio test file starts playing through one or more of the speakers S1 through Sn and then stops (203). In one embodiment, the app can control what audio test file to play. The user could then be instructed to reposition the microphone (204), e.g., by placing the microphone next to his or her right ear, at which point another (or the same) test file is played (205). Depending on the number of speakers in the system and/or the number of calibration tests, the user may be prompted to repeat this procedure a few times (e.g., a "yes" exit from block 206).

In one embodiment, with each test, a test result file is created or updated. For each test source, there will be an ideal test response. The device (or another system in communication therewith) will be able to calculate equalization parameters for each speaker in the system by performing spectral analysis on the received signal and comparing the ideal test response with the actual test response. For example, if the test source were an impulse function, the ideal response would have a flat frequency spectrum and the actual response would be easy to compare. However, for a number of reasons, different signals, selected to accommodate phase equalization and to deal with other types of impairments, may be used.

In one embodiment, calculation of the optimal equalization parameters is performed in a way that accommodates the transfer function of the microphone. This function will typically vary among different microphone designs, and so it will typically be important to have this information so that this transfer function can be subtracted out of the system. Thus, in some embodiments, a database (e.g., an Internet accessible database) of microphone transfer functions is maintained that can be referenced by the app. In the present case of the mobile smartphone, lookup of the transfer function is straightforward and can typically be performed by the app without any input from the user, because the app can reference the system information file of the smartphone to determine the model number of the phone, which can then be used to look up the transfer function in the database (106). The response curve may, for example, contain data such as illustrated at http://blog.faberacoustical.com/2009/ios/iphone/iphone-microphone-frequency-response-comparison, and this data can then be used in the computation of the optimal filter characteristics, as indicated above. In other embodiments, one or more transfer functions could be stored locally on the device itself, and no network connection would be needed.

Referring once again to FIG. 2, once the measurements and the calculations are complete, the optimal equalization parameters can be made available to the digital signal processor 102 which can implement filters for equalizing the non-ideal responses of the room environment, and the speakers (208). This can include, for example, equalization for room reflections, cancellation of crosstalk from multiple channels, and/or the like. When additional audio content is sent to the speakers for playback, DSP 102 applies the equalization parameters to the audio content signal before sending the appropriately processed signal to the speakers for playback.

It will be appreciated that there are a number of variations of the systems and methods described herein for facilitating use of a portable device to calibrate digital filters that can optimize the function of speakers in a particular environment. For example, one way of simplifying the method described in connection with FIG. 2 at small expense is to provide binaural microphones that can plug into the audio port of the user's portable device (e.g., mobile phone, tablet, etc.). These microphones would be designed to be placed close to the user's ears for the calibration process described above. For example, these microphones could be built into a standard headset. Yet another way to simplify the process illustrated in FIG. 2 in accordance with one embodiment would be to play the test file (e.g., sequentially) from each of the speakers before repositioning the microphone (e.g., before prompting the user to move the microphone to a location next to his or her other ear), thereby avoiding repeated (and potentially imprecise) positioning of the microphone. Alternatively, or in addition, multiple test files (perhaps containing different content and/or different frequencies) could be play by each of the speakers simultaneously, thereby, once again, enabling the calibration process to be performed without repeated repositioning of the microphone for each speaker. Thus it should be understood that FIG. 2 has been provided for purposes of illustration, and not limitation, and that a number of variations could be made without departing from the principles described herein. For example, without limitation, the order of the actions represented by the blocks in FIG. 2 could be changed, certain blocks could be removed, and/or other blocks could be added. For example, in some embodiments a block could be added representing the option of calibrating the microphone. For example, a manufacturer could store the device's acoustic response curves (e.g., microphone and/or speaker) on the device during manufacture. These could be device-specific or model-specific, and could be used to calibrate the microphone, e.g., before the other actions shown in FIG. 2 are performed.

It will also be appreciated that while certain examples have been described for facilitating calibration and optimization of speaker systems, some of the principles described herein are suitable for broader application. For example, without limitation, a device (e.g., a mobile phone, tablet, etc.) comprising a microphone and a speaker could be used to perform some or all of the following actions using audio detection and processing techniques such as those described above:

- Using the ring tone as a probe signal.
- Measuring room size.
- Measuring the distance to another device.
- Recognizing familiar locations by room response.
- Detecting room features, like double-pane windows, narrow passages, and/or the like.
- Mapping a room acoustically.
- Detecting being outdoors.
- Measuring temperature acoustically.
- Identifying the bearer by voice (e.g., for detecting theft and/or positively identifying the user to facilitate device-sharing).
- Detecting being submerged underwater.
- Correlating acoustic data with camera data, GPS, etc.
- Acoustic scene analysis (e.g., identification of other ring tones, ambient noises, sirens, alarms, familiar voices and sounds, etc.).

Figure 3:
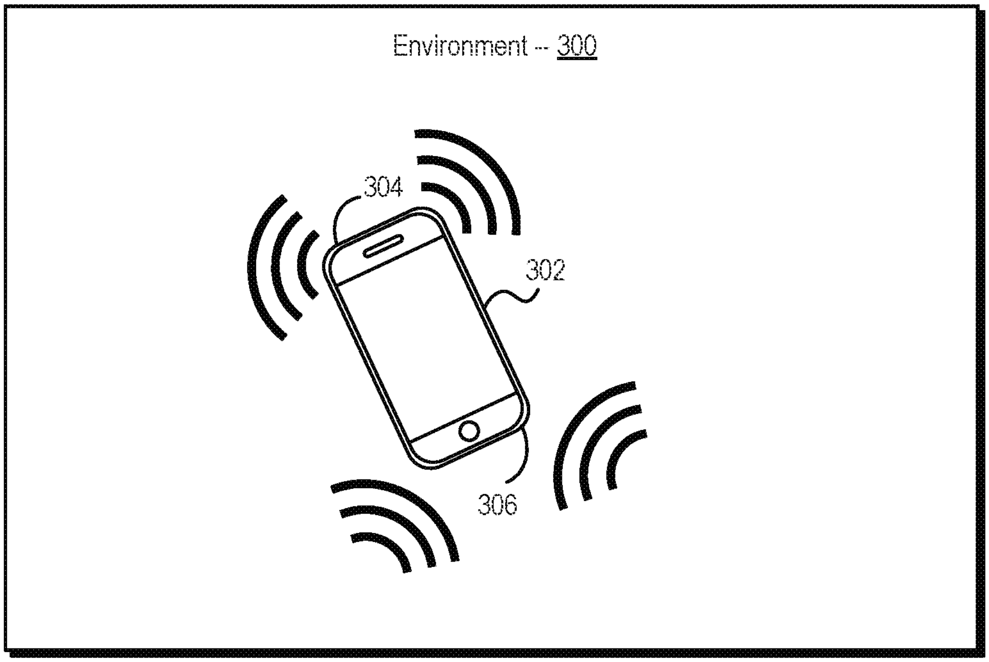
FIG. 3 illustrates a system for deducing environmental characteristics in accordance with one embodiment.

FIG. 3 illustrates a system for deducing environmental characteristics in accordance with one embodiment. As shown in FIG. 3, a device 302 could emit a signal from its speaker(s) 304, which it would then detect using its microphone 306. The signal detected by microphone 306 would be influenced by the characteristics of environment 300. Device 302, and/or another device, system, or service in communication therewith, could then analyze the received signal and compare its characteristics to those that would be expected in various environments, thereby enabling detection of a particular environment, type of environment, and/or the like. Such a process could, for example, be automatically performed by the device periodically or upon the occurrence of certain events in order to monitor its surroundings, and/or could be initiated by the user when such information is desired.

Figure 4:
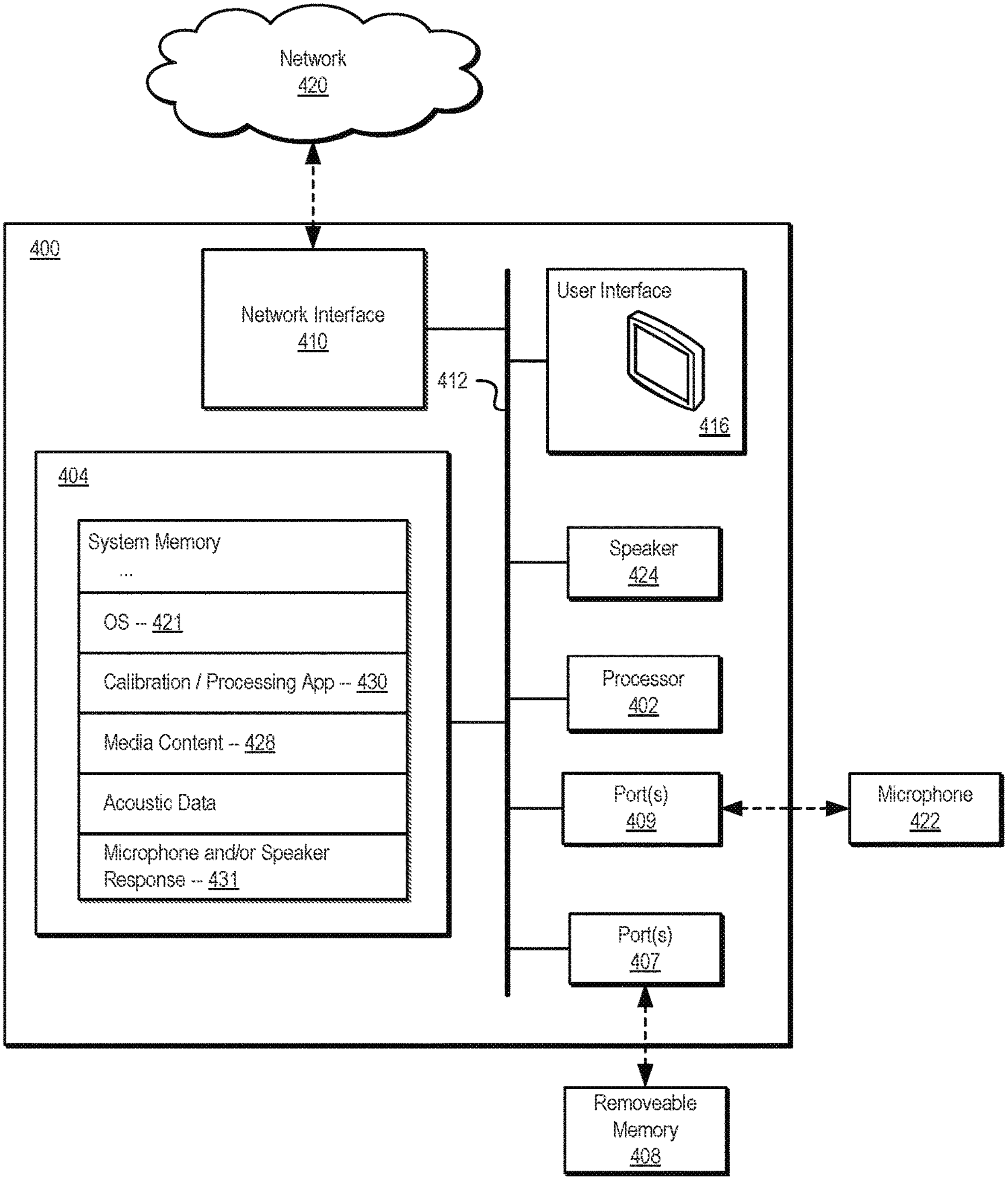
FIG. 4 shows an illustrative system that could be used to practice embodiments of the inventive body of work.

FIG. 4 shows a more detailed example of a system 400 that could be used to practice embodiments of the inventive body of work. For example, system 400 might comprise an embodiment of a device such as device 104 or Internet web service 106 in FIG. 1. System 400 may, for example, comprise a general-purpose computing device such as a personal computer, tablet, mobile smartphone, or the like, or a special-purpose device such as a portable music or video player. System 400 will typically include a processor 402, memory 404, a user interface 406, one or more ports 406, 407 for accepting removable memory 408 or interfacing with connected or integrated devices or subsystems (e.g., microphone 422, speakers 424, and/or the like), a network interface 410, and one or more buses 412 for connecting the aforementioned elements. The operation of system 400 will typically be controlled by processor 402 operating under the guidance of programs stored in memory 404. Memory 404 will generally include both high-speed random-access memory (RAM) and non-volatile memory such as a magnetic disk and/or flash EEPROM. Port 407 may comprise a disk drive or memory slot for accepting computer-readable media 408 such as USB drives, CD-ROMs, DVDs, memory cards, SD cards, other magnetic or optical media, and/or the like. Network interface 410 is typically operable to provide a connection between system 400 and other computing devices (and/or networks of computing devices) via a network 420 such as a cellular network, the Internet, or an intranet (e.g., a LAN, WAN, VPN, etc.), and may employ one or more communications technologies to physically make such a connection (e.g., wireless, cellular, Ethernet, and/or the like).

As shown in FIG. 4, memory 404 of computing device 400 may include data and a variety of programs or modules for controlling the operation of computing device 400. For example, memory 404 will typically include an operating system 421 for managing the execution of applications, peripherals, and the like. In the example shown in FIG. 4, memory 404 also includes an application 430 for calibrating speakers and/or processing acoustic data as described above. Memory 404 may also include media content 428 and data 431 regarding the response characteristics of the speakers, microphone, certain environments, and/or the like for use in speaker and/or microphone calibration, and/or for use in deducing information about the environment in which device 400 is located (not shown).

One of ordinary skill in the art will appreciate that the systems and methods described herein can be practiced with computing devices similar or identical to that illustrated in FIG. 4, or with virtually any other suitable computing device, including computing devices that do not possess some of the components shown in FIG. 4 and/or computing devices that possess other components that are not shown. Thus it should be appreciated that FIG. 4 is provided for purposes of illustration and not limitation.

The systems and methods disclosed herein are not inherently related to any particular computer, electronic control unit, or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that, when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, hard disk drive, a magnetic tape, a magnetic disk, flash memory, integrated circuits, or any other non-transitory digital processing apparatus or memory device.

Although the foregoing has been described in some detail for purposes of clarity, it will be apparent that certain changes and modifications may be made without departing from the principles thereof. It will be appreciated that these systems and methods are novel, as are many of the components, systems, and methods employed therein. It should be noted that there are many alternative ways of implementing both the processes and apparatuses described herein. Accordingly, the present embodiments are to be considered as illustrative and not restrictive, and the inventive body of work is not to be limited to the details given herein, but may be modified within the scope and equivalents of the appended claims.

What is claimed is:

1. A method for calibrating an audio playback system using an electronic device comprising:

establishing, by the electronic device, a network connection between the electronic device and the audio playback system;

sending, from the electronic device via the network connection, a first signal initiating a first playback of a piece of audio content by the audio playback system via a plurality of speakers, the first signal comprising at least one of an audio file corresponding to the piece of audio content and information to access the piece of audio content from an Internet music library;

detecting the first playback of the piece of audio content from each speaker of the plurality of speakers by a microphone associated with the electronic device, the microphone being positioned at a first location within an environment;

sending, from the electronic device via the network connection, a second signal initiating a second playback of the piece of audio content by the audio playback system via the plurality of speakers;

detecting the second playback of the piece of audio content from each speaker of the plurality of speakers by the microphone associated with the electronic device, the microphone being positioned at a second location within the environment;

determining one or more adjustments to be applied to additional audio content before additional audio content playback by the audio playback system, wherein determining the one or more adjustments comprises:

accessing a microphone transfer function file, the microphone transfer function file comprising an indication of a transfer function of the microphone;

determining the one or more adjustments using, at least in part, the transfer function of the microphone, the detected first playback of the piece of audio content from each speaker of the plurality of speakers, and the detected second playback of the piece of audio content from each speaker of the plurality of speakers; and transmitting an indication of the one or more adjustments to the audio playback system.

2. The method of claim 1, wherein the piece of audio content comprises one or more patterns.

3. The method of claim 2, wherein the one or more patterns comprise one or more synchronization patterns.

4. The method of claim 3, wherein determining the one or more adjustments to be applied to the additional audio content further comprises aligning the detected first playback of the piece of audio content with the piece of audio content based, at least in part, on the one or more synchronization patterns.

5. The method of claim 3, wherein determining the one or more adjustments to be applied to the additional audio content further comprises aligning the detected second playback of the piece of audio content with the piece of audio content based, at least in part, on the one or more synchronization patterns.

6. The method of claim 1, wherein the signal communicated from the electronic device comprises an electronic file corresponding to the piece of audio content.

7. The method of claim 1, wherein the electronic device comprises a smartphone.

8. The method of claim 1, wherein the electronic device comprises a tablet.

9. The method of claim 1, wherein the electronic device comprises a laptop computer system.

10. The method of claim 1, wherein determining the one or more adjustments to be applied to the additional audio content further comprises performing spectral analysis on the detected first playback of the piece of audio content and the detected second playback of the piece of audio content.

11. The method of claim 1, wherein determining the one or more adjustments to be applied to the additional audio content further comprises comparing frequency responses of the detected first playback of the piece of audio content and the detected second playback of the piece of audio content with an ideal frequency response.

12. The method of claim 1, wherein accessing the microphone transfer function file comprises accessing the microphone transfer function file from local storage of the electronic device.

13. The method of claim 1, wherein accessing the microphone transfer function file comprises accessing the microphone transfer function file from a remote library.

14. The method of claim 1, wherein the microphone comprises an integrated microphone of the electronic device.

15. The method of claim 1, wherein the microphone comprises a microphone separate from the electronic device configured to communicate electronically with the electronic device.

16. The method of claim 1, wherein the first playback of the piece of audio content comprises playback of the audio content by the audio playback system sequentially by each speaker of the plurality of speakers.

17. The method of claim 1, wherein the second playback of the piece of audio content comprises playback of the audio content by the audio playback system sequentially by each speaker of the plurality of speakers.

* * * * *